United States Patent [19]

Egawa et al.

[11] Patent Number: 4,470,935

[45] Date of Patent: Sep. 11, 1984

[54] PROCESS FOR PRODUCING MICROCAPSULES CONTAINING HYDROPHOBIC CORE MATERIAL FOR CARBONLESS DUPLICATING SHEETS

[75] Inventors: Setsuya Egawa; Sakamoto Masahiro, both of Oiso, Japan

[73] Assignee: Jujo Paper Co., Ltd., Tokyo, Japan

[21] Appl. No.: 452,215

[22] Filed: Dec. 22, 1982

[30] Foreign Application Priority Data

Dec. 24, 1981 [JP] Japan .................. 56-208150

[51] Int. Cl.$^3$ .............................................. B01J 13/02
[52] U.S. Cl. .............................. 264/4.7; 428/402.21; 264/4.3; 346/215
[58] Field of Search ............................. 264/4.3, 4.7; 428/402.21

[56] References Cited

U.S. PATENT DOCUMENTS

| | | | |
|---|---|---|---|
| 4,001,140 | 1/1977 | Foris et al. | 264/4.7 |
| 4,219,604 | 8/1980 | Kakimi et al. | 264/4.7 |
| 4,221,710 | 9/1980 | Hoshi et al. | 264/4.7 |
| 4,328,119 | 5/1982 | Iwasaki et al. | 264/4.7 |
| 4,353,809 | 10/1982 | Hoshi et al. | 264/4.7 |

FOREIGN PATENT DOCUMENTS

| | | |
|---|---|---|
| 55-132631 | 10/1980 | Japan . |
| 1091078 | 11/1967 | United Kingdom . |
| 2041319 | 9/1980 | United Kingdom ............ 264/4.7 |
| 2043022 | 10/1980 | United Kingdom ............ 264/4.7 |
| 2062570 | 5/1981 | United Kingdom . |
| 2079936 | 1/1982 | United Kingdom . |

*Primary Examiner*—Richard D. Lovering
*Assistant Examiner*—Anne Brookes
*Attorney, Agent, or Firm*—Koda and Androlia

[57] ABSTRACT

In preparing microcapsules for carbonless duplicating sheets using aminoaldehyde polycondensate as a capsule wall in a system in which the capsule wall is formed around the hydrophobic material in hydrophilic medium, wherein said hydrophilic medium comprises a combination of an anion-modified polyvinyl alcohol derivative containing sulfo group or sulfonyldioxyd group and an anion-modified water-soluble polymer containing a carboxyl group. The present invention provides a process for producing a high-concentration, low-viscosity microcapsule slurry having advantages such as easy workability, good stability for emulsion, etc.

4 Claims, No Drawings

PROCESS FOR PRODUCING MICROCAPSULES CONTAINING HYDROPHOBIC CORE MATERIAL FOR CARBONLESS DUPLICATING SHEETS

BACKGROUND OF THE INVENTION

1. Field of the Invention

This invention relates to a process for producing microcapsules for carbonless duplicating sheets comprising coating a hydrophobic core material with an aminoaldehyde polycondensate in a hydrophilic medium.

2. Prior Art

Recently, marked progress has been made in the techniques for producing microcapsules, and such techniques have been put into practical use for the preparation of perfumes, pharmaceuticals, adhesives, dyes, pigments, solvents and many others as well as carbonless duplicating sheets.

The techniques of producing microcapsules include mechanical processes, physicochemical processes, chemical processes and others. A technique proper for a specific purpose is used, but a coacervation process is frequently used because of its wide applicability. This coacervation process generally includes emulsifying a hydrophobic core material in gelatin, accumulating coacervation of a salt or a polyanion and gelatin around the emulsified droplets, forming capsule walls by cooling and curing/setting the capsule walls with formaldehyde or glutaraldehyde. This process has been widely used since the publication of U.S. Pat. No. 2,808,457.

However, in the application of coacervation process for the reduction of microcapsules for carbonless duplicating sheets, since gelatin is used as the principal material, the produced microcapsules are deficient in water resistance and in some cases the compactness of capsule walls is not sufficient. Above all, the process is complicated and requires delicate control.

In an attempt to solve these problems altogether, there have been proposed an interfacial polymerization process and an in situ polymerization process, comprising forming and accumulating synthetic resin films around cores of a hydrophobic material to form microcapsules.

For example, Japanese Patent Publication Nos. 446/1967, 2882/1967, 11344/1967 and 20069/1972 describe interfacial polymerization processes for producing polyurea wall capsules comprising polyurethane and a cyclic amine, epoxy resin wall capsules, polyester wall capsules and polyamide wall capsules. However, these processes have limited use because the kind of a core material to be encapsulated is limited owing to the strong reactivity of a starting monomer which forms wall films, and usually the capsule walls are thin and permeable.

On the other hand, the in situ process comprises supplying a reactive monomer or its precondensate from either one of a core material and an encapsulation medium and polycondensing or polyadding the monomer or the precondensate by heating or a like operation. As the wall materials used in this in situ polymerization process, there are mentioned almost all synthetic resins such acrylate resins, polyurethane resins, aminoaldehyde resins and polyester resins. Above all, aminoaldehyde resins have many advantages that the materials are easily available, the cost is low, no special catalyst is required for the resin forming reaction, the reaction temperature is low, i.e. under 90° C. and the reaction time is short. Therefore, a number of studies have been made as described below.

Japanese Patent Publication Nos. 12380/1962, 12518/1963 and Laid Open No. 42380/1972 describe the use of melamine, urea, a polyhydric phenol, formaldehyde and a precondensate thereof as a starting material and the use of a surface active agent or gelatin as a dispersion stabilizer. However,m it has not been possible to obtain capsules having a good distribution and good compactness.

Japanese Patent Publication No. 30282/1971 and 23165/1972 describe that capsule walls are formed from a starting material which consists of urea/formaldehyde, methylated methylolurea/formaldehyde, dimethylated methylolurea/formaldehyde or a precondensate thereof. However, no dispersion emulsifier is used resulting in that capsules having a good distribution are not obtained. In addition the efficient accumulation of a capsule-forming material around the core material is not achieved; therefore, only thin capsule walls can be obtained.

Japanese Patent Laid Open Publication No. 144383/1976 describes a process in which capsule walls are formed by using a water-soluble polyhydroxy compound such as methylcellulose as an emulsifier and reacting this with an aldehyde or a precondensate of urea or melamine and formaldehyde. However, in this process, because the emulsifier itself takes part in the capsule-forming reaqtion, there is a difficulty in obtaining an efficient accumulation around the core material and therefore only thin wall films can be obtained.

Japanese Patent Laid-Open Nos. 84881/1978, 84882/1978 and 84883/1978 and Japanese Patent Publication No. 16949/1979 teach that it is possible to obtain capsules which are single particles, less agglomerated, tough enough to handle and good in film compactness, within a short time in the form of a capsule slurry in high yields and concentrations by employing, in a monomeric or precondensate form, urea or melamine and formaldehyde, methylated dimethylolurea, methylated methylolurea and methylolmelamine or methylated methylolmelamine as a starting material for capsule wall films and employing polyacrylic acid or bipolymer of maleic anhydride as a system modifier. Although the system modifier disclosed therein has some advantages of its own, it has drawbacks that the uniformity of a capsule size is somewhat poor, the viscosity of capsule slurry is yet high, the bipolymer of maleic anhydride requires much time for its dissolution, or the like. In order to overcome these drawbacks, a combination of a styrene/maleic anhydride copolymer and a vinyl acetate/maleic anhydride copolymer is used as a system modifier (Japanese Patent Laid-Open Nos. 49984/1979 and 47139/1980). This process can provide capsule slurry with higher solid concentration and lower viscosity. However, the process is not applicable to a urea/formaldehyde system or the like which requires wall forming conditions including a pH $\leq$ 4, because, when the pH in the reaction is not higher than 4, the styrene/maleic anhydride copolymer deposits.

Japanese Patent Laid Open Publication No. 51431/1980 describes that, in case where a polymer of formaldehyde and melamine is used as a capsule wall-forming material, a slurry with an extremely low viscosity can be obtained by adding gum arabic to the system. However, the stability of the emulsified particles is poor during the capsule wall-forming reaction, and only capsules with an extremely poor particle size distribution can be obtained.

Moreover, Japanese Patent Laid-Open No. 51238/1981 proposes that, in a process for producing capsules comprising using a melamine/formaldehyde polymer as a wall-forming material, a styrenesulfonic acid polymer is added as an anionic polyelectrolyte. However, this process has a difficulty in operability, for example, foaming during the dissolution of polymer, and the compactness of the obtained capsule walls is not satisfactory. Especially, when this process is applied to a system in which a urea/formaldehyde resin is used as a wall-forming material, a slight change in condition causes the entire system to agglomerate.

Japanese Patent Laid-Open No. 92135/1980 describes that, in a process for producing capsules comprising using an aminoaldehyde resin as a wall-forming material, an anion-modified polyvinyl alcohol, particularly a polyvinyl alcohol having carboxyl groups as the anions is used. However, when a high-saponification degree polyvinyl alcohol is used, in case where a core material is emulsified, the distribution of the emulsified particles is not good, the stability of the emulsified particles is not sufficient during the capsule forming reaction and only capsules with a wide particle size distribution are produced. A low-saponification degree polyvinyl alcohol causes an increase in slurry viscosity during the capsule forming reaction.

Japanese Patent Laid-Open No. 132631/1980 describes that in a process for producing microcapsules comprising using a urea/formaldehyde copolymer as capsule walls, microcapsules having good compactness can be obtained by using a polyvinyl alcohol having a saponification degree of at least 95% alone or in combination with a variety of water-soluble polymers. However, in this process, the viscosity increases during the capsule wall-forming reaction, resulting in agglomeration of capsules or a maldistribution of emulsified particles.

Furthermore, Japanese Patent Laid-Open No. 58536/1981 describes that, in a process for producing microcapsules comprising using a melamine/formaldehyde precondensate as a wall material, a sulfonic acid group-containing polymer or copolymer is added. However, the monomers used are uncommon in a process for producing microcapsules for carbonless duplicating sheets and, therefore, can not be widely used from the viewpoint of a process for polymerization, quality, cost, etc.

SUMMARY OF THE INVENTION

In producing microcapsules for carbonless duplicating sheets using an aminoaldehyde polycondensation resin as the capsule wall, the object of the present invention lies in a process for producing a high-concentration, low-viscosity microcapsule slurry having advantages such as easy workability, for example, dissolution, a good emulsifying power for a hydrophobic core material, good stability for emulsion simple and short reaction, and good compactness of capsule walls using an aminoaldehyde polycondensation resin as capsule walls.

In keeping with the principles of the invention, the objects are accomplished by a unique process which comprises forming capsule walls by accumulating aminoaldehyde polycondensate around a hydrophobic material in a hydrophilic medium wherein said hydrophobic medium comprises a combination of an anion-modified water-soluble polymer containing carboxyl group and an anion-modified polyvinyl alcohol derivative containing sulfo group and/or sulfonyldioxy group in a mixing ratio of 10:90 to 90:10, the saponification degree of said anion-modified polyvinyl alcohol derivative ranges from 93 to 99 percent, and sulfo group or sulfonyldioxy group content of said anion-modified polyvinyl alcohol derivative ranges from 0.5 to 20 mol percent.

DETAILED DESCRIPTION OF THE INVENTION

This invention is characterized in using a medium comprising a combination of an anion-modified polyvinyl alcohol derivative containing sulfo group or sulfonyldioxy group and an anion-modified water-soluble polymer containing carboxyl group. If the anionic polyvinyl alcohol derivative containing sulfo group or sulfonyldioxy group is used alone, the system is markedly thickened during the capsule wall forming reaction, and in an extreme case the entire system gels so that the encapsulation reaction becomes impossible. However, a combination of the above polyvinyl alcohol derivative and the anionic water-soluble polymer containing a carboxyl group is used, it becomes possible to obtain a low-viscosity, high-concentration capsule slurry and, at the same time, to obtain capsules with a uniform particle size. Of course, these properties are superior to those in case where an anionic water-soluble polymer containing a carboxyl group, for example, maleic anhydride copolymer or polyacrylic acid polymer is used alone.

The reason why these properties are markedly improved by the combined use is not clear, but may be best explained as follows. By the introduction of a sulfo group or sulfonyldioxy group, the aminoaldehyde resin-forming reaction is promoted, but for the formation of capsule walls it is necessary that the polycondensation reaction proceeds while the aminoaldehyde precondensate is adsorbed around a core material. Perhaps, this adsorption of the precondensate around the core material is suitably controlled by a combined use of the polymer or copolymer containing carboxyl group, and this results in the formation of good capsules.

With respect to the anion-modified polyvinyl alcohol derivatives used in this invention, those having sulfo group can be prepared by copolymerizing vinyl acetate with, for example, vinylsulfonic acid, allylsulfonic acid, methallylsulfonic acid or a salt thereof and then saponifying the resulting polymer in an alkali or acid solution containing methanol or ethanol, and those having sulfonyldioxy group can be prepared, for example, by heating polyvinyl alcohol in concentrated sulfuric acid. The sulfo group or sulfonyldioxy group content of these anion-modified polyvinyl alcohol derivatives is selected preferably from the range: 0.5 to 20 mol %, particularly 3 to 15 mol %, because, when the content is lower than 0.5 mol %, the effect is somewhat poor, and when it is higher than 20 mol %, the production of the derivatives themselves becomes difficult. With respect to the saponification degree, it largely affects the accumulation of an aminoaldehyde resin around a hydrophobic core material. Namely, when the saponification degree is low, a good emulsifying power is obtained, but the slurry tends toward thickening in the polycondensation of aminoaldehyde by the acetalization reaction, whereas a fully saponified polyvinyl alcohol is somewhat poor in emulsifying power and protective colloid performance. Accordingly, the saponification degree is in the range: 93 to 99%, preferably in the range: 95.5 to 98.5% in consideration of emulsifying power, stability for emulsion and accumulation of the aminoaldehyde resin around the core material.

On the other hand, the anionic water-soluble polymers containing a carboxyl group used in this invention, as a component, at least one member selected from the group consisting of acrylic acid, methacrylic acid, crotonic acid, fumaric acid, mesaconic acid, maleic acid, citraconic acid, itaconic acid, and anhydrides or partial ight metal salts thereof (Na, K, Li) and preferred to have a carboxyl content of 10 to 100 mol %. These polymers can be homopolymers or copolymers. The homopolymers includes, for example, acrylic acid polymers and maleic anhydride polymers, and the copolymers are typified by those set forth below but not limited to those. Here, copolymers are represented by their components. As the acrylic acid copolymers, there can be mentioned, for example, acrylic acid/methacrylic acid, acrylic acid/methacrylic acid/alkyl acrylate, acrylic acid/methacrylic acid/alkyl acrylate/alkyl methacrylate, acrylic acid/methacrylic acid/ethoxyethyl methacrylate, acrylic acid/methacrylic acid/acrylamide, acrylic acid/maleic anhydride, acrylic acid/maleic anhydride/alkyl acrylate, acrylic acid/fumaric acid, acrylic acid/itaconic acid, acrylic acid/itaconic acid/alkyl acrylate, acrylic acid/alkyl acrylate, acrylic acid/hydroxyalkyl methacrylate, acrylic acid/alkyl acrylate/glycidyl methacrylate, acrylic acid/acrylamide, acrylic acid/styrene, acrylic acid/divinylbenzene, acrylic acid/ethylene/vinyl acetate, acrylic acid/mesaconic acid/vinyl acetate, acrylic acid/citraconic acid/vinyl acetate, acrylic acid/maleic anhydride/vinyl chloride/vinyl acetate, acrylic acid/vinyl acetate, and acrylic acid/hydroxylethyl methacrylate/vinyl acetate.

As the methacrylate copolymers, there can be mentioned, for example, methacrylic acid/vinyl acetate, methacrylic acid/crotonic acid/vinyl acetate, methacrylic acid/acrylonitrile, methacrylic acid/alkyl methacrylate/vinyl acetate, methacrylic acid/hydroxyethyl methacrylate, methacrylic acid/maleic anhydride/hydroxyethyl methacrylate, methacrylic acid/alkyl acrylate, methacrylic acid/maleic anhydride/alkyl methacrylate, methacrylic acid/styrene, and methacrylic acid/acrylamide.

As the fumarate copolymers, there can be mentioned, for example, fumaric acid/vinyl acetate, fumaric acid/alkyl acrylate, and fumaric acid/alkyl methacrylate.

As the itaconate copolymers, there can be mentioned for example, itaconic acid/acrylamide, itaconic acid/alkyl acrylate, itaconic acid/alkyl methacrylate itaconic acid/acrylonitrile, itaconic acid/propylene, and itaconic acid/vinyl acetate.

As the maleate copolymers, there can be mentioned, for example, ethylene/maleic anhydride, isobutylene/maleic anhydride, butene/maleic anhydride, α-olefin/maleic anhydride, alkyl vinyl ether/maleic anhydride, vinyl acetate/maleic anhydride vinyl acetate/maleic acid, maleic anhydride/alkyl acrylate, maleic anhydride/alkyl methacrylate, maleic anhydride/acrylamide, styrene/maleic acid, maleic acid/vinyl acetate/crotonic acid, maleic anhydride/vinyl acetate/hydroxyalkyl methacrylate, and maleic anhydride/acrylonitrile/acrylamide.

In the general practice of the process of this invention, a solution containing an emulsifier is prepared and a core material to be encapsulated is emulsified in the solution. The amino compound as a wall-forming material can be added before or after the emulsification. Then, capsule walls are formed by adding an aldehyde, raising the temperature under continued agitation and holding the mixture for a definite time and, if necessary, carrying out an after-treatment such as pH adjustment, thereby completing the encapsulation.

The aminoaldehyde resin which forms capsule walls can be obtained, by polycondensing at least one member selected from the group consisting of, for example, urea, methylolurea, alkylurea, thiourea, melamine, alkylmethylolmelamine and guanidine with an aldehyde such as formaldehyde, paraformaldehyde, glyoxal, hexamethylenetetramine, crotonaldehyde or glutaraldehyde, and these monomers are used in the form of a monomer or precondensate.

The emulsifier which is used in this invention consists of a combination of the above-described polyvinyl alcohol derivative containing sulfo group or sulfonyldioxy group and the above-described anionic water-soluble polymer containing carboxyl group. The mixing ratio ranges from 90:10 to 10:90, preferably from 70:30 to 30:70. The quantity of the emulsifier in the hydrophilic encapsulation medium is such that the hydrophilic medium contains generally at least 1% by weight, preferably at least 3% by weight of an emulsifier. The upper limit of the quantity can not be specified, but usually, it is not more than 15% by weight, in consideration of the viscosity of the system. The reaction conditions for encapsulation include a pH of 1 to 5, a temperature of 30° to 90° C., preferably 45° to 75° C. in consideration of the conditions for forming an aminoaldehyde resin. The reaction time depends upon the kinds of equipment, but is about 0.5 to 6 hours for a beaker scale production. In this case, the agitation speed, the rate of temperature rise and the heating and holding time greatly affect the properties of walls of the capsules formed, so it is necessary to select a rate of temperature rise which ensures a uniform polycondensation reaction and efficient accumulation around a core material, while agitating the mixture at a speed which does not cause involvement of bubbles.

After holding for a definite period of time, the encapsulation is completed, but if necessary an after-treatment, for example, pH adjustment is carried out using a basic substance such as an alkali metal hydroxide, aqueous ammonia or tirethanolamine, or the unreacted aldehyde is removed using a chemical reagent such as sodium sulfite, formamide, hydroxylamine hydrochloride or urea, or by means of steam distillation.

As the core materials to be encapsulated, there can be used a hydrophobic liquid or solid and a solution prepared by dissolving or dispersing a different hydrophobic substance in a hydrophobic liquid, and the following materials are used according to the object: natural mineral oils such as petroleum distillates, synthetic oils such as isopropylbiphenyl, animal oils such as lard oil, vegetable oils such as castor oil or those oils containing or not containing dissolved or dispersed pigments, dyes.

In the description which follows, all parts are parts by weight.

The microcapsules obtained in the examples and the comparative examples were evaluated by the following procedures for viscosity, emulsifying power, stability for emulsion and wall compactness.

(1) Viscosity: measured by using a Brookfiled Rotational Viscometer (No. 2 rotor) under conditions: 12 rpm, 25° C. The viscosity represents the easiness of application, and generally, more types of coaters can be used for a lower viscosity slurry than for a higher viscosity one.

(2) Emulsifying Power: represented in terms of an average capsule size obtained by measuring an emulsion prepared under a definite condition by Coulter counter model TA-II Particle Size Analyzer (made by Coulter Electronics, Co.), that is, a particle size at 50% volume point. When an emulsifying power is strong, the average particle size is small.

(3) Stability For Emulsion: A difference between an average particle size after emulsification and that after encapsulation, both determined by a Coulter counter model TA-II is defined as a diameter change of the particle, and a difference between a particle size at a 25% volume point after encapsulation and that at a 75% volume point is defined as a distribution width of the particle. A slurry with a good stability for emulsion has a small size change and a small particle size distribution width.

(4) Wall Compactness: A top sheet was obtained by coating a stock paper, 40 g/cm$^2$, with a coating color prepared by mixing and dispersing 180 parts of a capsule slurry, 35 parts of wheat starch, 85 parts of an 8-% wheat starch solution in 340 parts of water, at a coating weight of 4.5 g/m$^2$ by use of a wire bar and drying the coating film. This top sheet was placed in an oven at 105° C. for 24 hours, laid upon a bottom sheet (W-50 BR made by Jujo Papermaking Co.), and allowed to form an image by passing through a calender, linear pressure 15 kg/cm. Another top sheet stored separately in the room was similarly calendered to form an image. The degree of heat deterioration was tested by comparing the densities expressed reflectance of the colored images determined by a Color and Color Difference Meter Model TC-1500 MC (made by Tokyo Denshoku Co., Ltd.).

EXAMPLE 1

Sixty (60) parts of a 10% aqueous solution of a sulfonic acid-modified polyvinyl alcohol (average polymerization degree about 300, saponification degree 97%, modification degree 10 mol %) was mixed with 30 parts of a 10-% aqueous solution of an ethylene/maleic anhydride copolymer (trademark EMA-31, Monsanto Co.) and 90 parts pf dilution water. Then, 10 parts of urea and 1 part of resorcinol were dissolved in the solution, and the resulting solution was adjusted to a pH of 3.4 by addition of a 20-% aqueous caustic soda. Separately, as a core material, an oil including dye was prepared by dissolving 7 parts of Crystal Violet Lactone (CVL) and 1 part of Benzoyl Leuco Methylene Blue (BLMB) in an oil mixture consisting of 100 parts of alkyldiphenylethane (trademark Hysol SAS 296, made by Nisseki Chemical Co.) and 72 parts of diisopropylnaphthalene (trademark KMC-113, made by Kureha Chemical Co.) by heating at 90° C. for 1 hour and cooling the mixture to room temperature. This oil included dye (180 parts) was added to the above-produced aqueous solution containing an emulsifier and a wall-forming agent, and the resulting solution was agitated carefully so as ot to cause a phase inversion, and emulsified for 2 minutes by a Homomixer (made by Tokushu Kika Kogyo Co., Ltd.) under conditions of 100 V and 9,000 rpm. An oil-in-water emulsion containing particles with an average particle size of 4.0μ was obtained. To this emulsion was added 27 parts of 37-% formalin, and the mixture was heated to 55° C. under continued agitation. After carrying out an encapsulation reaction at 55° C. for 2 hours, the temperature of the system was lowered to 40° C., and the reaction solution was adjusted to a pH of 7.5 by addition of 28-% ammonia, and the encapsulation was completed.

The capsule slurry obtained had a low viscosity, and was suitable for coating. In order to test the agglomeration, 100 parts of the slurry was diluted with water to a half concentration and filtered through a 200-mesh sieve. As a result, no residue was left.

EXAMPLE 2

One hundred and fifty (150) parts of a sulfuric acid-modified polyvinyl alcohol (average polymerization degree 300, saponification degree 97.5%, modification degree 13 mol %) was charged, with agitation, in a stainless steel vessel containing 1,350 parts of city water at room temperature, and the agitation was continued for 45 minutes to obtain a 10% aqueous solution completely free of undissolved matter. Here, the polyvinyl alcohol can be dissolved more rapidly if the mixture is heated to 40° to 50° C. This 10-% aqueous solution (60 parts) was mixed with 30 parts of a 10-% aqueous solution of an ethylene/maleic acid copolymer. In this solution were added 90 parts of water, dissolved 10 parts of urea and 1 part of resorcinol, and the resulting solution was adjusted to a pH of 3.4 by addition of a 20-% caustic soda, and was mixed with 180 parts of the core material used in Example 1. This mixture was emulsified for 2 minutes by the Homomixer under conditions of 100 V and 9,000 rpm. The emulsifying power was strong, and uniform emulsified particles with an average particle size of 3.9μ were obtained. Then, a capsule slurry was produced in the same manner as in Example 1.

The slurry obtained had a low viscosity. The deposits on the stainless steel vessel wall were small in quantity and were readily washed off. In order to test the state of agglomeration, a portion of the slurry was taken, diluted with city water to a half concentration and filtered through a 200-mesh sieve. The sample left no residue, and was suitable for coating.

COMPARATIVE EXAMPLE 1

Into a 2-1 stainless steel vessel containing 1,350 parts of city water was added slowly, with stirring, 150 parts of an ethylene/maleic anhydride copolymer powder (trademark EMA-31, made by Monsanto Co.). The mixture was heated under continued agitation to give a complete solution within 30 to 40 minutes after the temperature reached 90° C. The heating was stopped, the vessel was replaced on a water bath at 20° C. and agitated constantly. When the temperature was lowered to 25° C., the vessel was withdrawn from the water bath. By making compensation for the evaporated water, a 10-% aqueous solution of the ethylene/maleic anhydride copolymer was obtained. A capsule slurry was produced in the same manner as in Example 1, except that 90 parts of this aqueous solution was used to emulsify the core material.

The capsule slurry produced had a considerably high viscosity, and the deposits on the stainless steel vessel wall were somewhat difficult to wash off. In order to test the agglomeration, a portion of the slurry was taken and diluted with water to a half concentration. The diluted slurry sample was passed through a 200-mesch sieve. As a result, some residue was left.

COMPARATIVE EXAMPLE 2

Into a stainless steel vessel containing 1,350 parts of city water was added slowly, with agitation, 150 parts of an unmodified polyvinyl alcohol powder (trademark Gosenol A-300, made by Nippon Gosei Chemical Co. saponification value 97 to 98.5). The mixture was heated under continued agitation to 80° to 90° C. to give a complete solution within 30 to 40 minutes after the temperature reached 80° C. The heating was stopped, the vessel was replaced on a water bath and allowed to cool to room temperature. By making compensation for the vaporized water, a 10-% aqueous solution of the polyvinyl alcohol was obtained. In 90 parts of this aqueous solution were further added 90 parts of city water and 10 parts of urea and 1 part of resorcinol as wall materials and then the solution was adjusted to a pH of 3.4 by addition of a 20-% aqueous caustic soda. This solution was mixed, under agitation, with 180 parts of the oil included dyes in Examples 1 as a capsule core material and emulsified for 2 minutes by the Homomixer, 100 V, 9,000 rpm. As a result, an emulsion having a uniform particle size distribution with an average particle size of 4.0μ was obtained. This emulsion was mixed with 27 parts of 37-% formalin and heated under continued agitation. As the temperature rose and the condensation reaction between urea and formaldehyde progressed, the viscosity of the entire system increased, and when the reaction was further continued, the entire system became an unstirrable gel-like mass.

A portion of the mass was taken and diluted. As a result, it was found that the oil included dyes acting as a core material were separated, and the urea/formaldehyde concensate could hardly form capsule walls.

COMPARATIVE EXAMPLE 3

Emulsification was carried out in the same manner as in Example 1, except that 90 parts of the 10-% aqueous solution of a sulfuric acid-modified polyvinyl alcohol used in Example 1 was used. As a result, the produced emulsion had a good emulsifying power with an average particle size of 3.9μ, and relatively uniform distribution. This emulsion was mixed with 27 parts of 37-% formalin, and heated under continued agitation. As the condensation between urea and formaldehyde proceeded, the viscosity of the system increased gradually. The viscosity rise was lower than that in Comparative Example 2, but 30 minutes after the temperature reached 55° C., the system became hardly filterable. By microscopic observation it was found that the capsules were wholly agglomerated together. In order to examine the degree of capsule wall formation, this slurry was added to a 0.5% aqueous solution of resorcinol having an ability to form a color by a reaction with a dye. As a result, a blue color was formed at once, and it was found that the urea/formaldehyde polycondensate could hardly form capsule walls.

The evaluation of the capsule slurries obtained in the above Examples and Comparative Examples are shown in Table 1.

Comparative Examples 2 and 3 were omitted because in these Examples, it was impossible to obtain capsule coating solutions.

TABLE 1

|  | Example 1 | Example 2 | Comparative Example 1 |
|---|---|---|---|
| Slurry Viscosity (cps) | 355 | 330 | 1,500 |

TABLE 1-continued

|  | Example 1 | Example 2 | Comparative Example 1 |
|---|---|---|---|
| Emulsifying Power (μ) | 4.1 | 3.9 | 4.2 |
| Stability for Emulsion (μ) | | | |
| Change in Average Size | 0.1 | 0.1 | 0.2 |
| Distribution Width | 2.2 | 2.1 | 3.0 |
| Wall Film Compactness | good | good | somewhat poor |
| Agglomerate | null | null | some little |

EXAMPLE 3

Into 1,350 parts of city water at room temperature was introduced 150 parts of sulfonic acid-modified polyvinyl alcohol powder (average polymerization degree about 400, saponification degree 95%, modification degree 10 mol %), and the mixture was further agitated. After 40 minutes, a uniform aqueous solution was obtained. Separately, a 10-% aqueous solution of a polyacrylic acid (trademark Acrysol A-3, made by Rohn & Haas Co.) was prepared by heating and agitation. This polyacrylic acid solution (30 parts) was mixed with 60 parts of the 10-% aqueous solution of the sulfonic acid-modified polyvinyl alcohol to form a uniform solution. Then, a capsule slurry was prepared in the same manner as in Example 1. The emulsified particles had an average particle size of 4.2μ. The subsequent reaction could proceed well without thickening of the system. The slurry obtained had a relatively low viscosity and was satisfactory for handling. The slurry was diluted to a half concentration and filtered through a 200-mesh sieve. As a result, no residue was left.

COMPARATIVE EXAMPLE 4

A capsule slurry was produced in the same manner as in Example 3, except that 90 parts of a 10-% aqueous solution of a polyacrylic acid was used instead of the mixed solution used instead of the mixed solution used in Example 3. The emulsified particles had a somewhat larger average particle size (5.2μ) and a weak emulsifying power. As the condensation between urea and formaldehyde proceeded, thickening was observed. The capsule slurry obtained had agglomerates partially. Even when this slurry was diluted to a half concentration, it was almost impossible to filter the slurry through a 200-mesh sieve.

The evaluation of the slurries obtained in Example 3 and Comparative Example 4 are shown in Table 2.

TABLE 2

|  | Example 3 | Comparative Example 4 |
|---|---|---|
| Slurry Viscosity (cps) | 530 | 4,800 |
| Emulsifying power (μ) | 4.2 | 5.2 |
| Stability for Emulsion (μ) | | |
| Change in Average Size | 0.1 | 0.4 |
| Distribution Width | 2.7 | 4.6 |
| Wall Film Compactness | good | somewhat poor |
| Agglomerate | null | much |

EXAMPLE 4

Into 1,350 parts of city water at room temperature was introduced 150 parts of a sulfonic acid-modified polyvinyl alcohol (average polymerization degree about 300, saponification degree 93%, modification degree 10 mol %). The mixture was agitated and a uniform aqueous solution was obtained after 30 to 40 minutes. Encapsulation was carried out in the same manner as in Example 1, except that 60 parts of this aqueous solution was mixed with 60 parts of a 10-% aqueous solution of an ethylene/maleic acid copolymer. The emulsifying power was good and the average particle size was 4.0μ. As the condensation reaction between urea and formaldehyde proceeded, the viscosity of the system increased, and the final capsule slurry had a relatively high viscosity (940 cps), but when tested for its film compactness as a coating, it showed far better compactness then the ethylene/maleic anhydride copolymer in Example 1, and had sufficient utility.

EXAMPLE 5

Fifteen (15) parts of a styrene/maleic anhydride copolymer (trademark Scripset 520, Monsanto Co.) was introduced into 135 parts of city water under agitation to obtain a 10-% aqueous solution. This solution (40 parts) was mixed with 60 parts of a 10-% aqueous solution of the sulfonic acid-modified polyvinyl alcohol used in Example 1, and was adjusted to a pH of 5.5 by addition of a 20-% aqueous caustic soda. This mixture was further mixed with 180 parts of the oil included dyes used in Example 1 and emulsified for 2 minutes by the Homomixer, 100 V, 9,000 rpm. As a result, emulsified particles with an average particle size of 4.4μ were obtained. This emulsion was mixed with 60 parts of a 40-% aqueous solution of a methylated methylolmelamine (trademark Rezmine 714, Monsanto Co.) and heated under agitation and reacted at 60° C. for 1 hour to obtain a capsule slurry which was not viscous and easily handleable and had a high degree of whiteness. The viscosity of the slurry was 270 cps, and the film compactness was comparable to that in Example 1. The capsules were uniform, the average particle size of capsules was 4.5μ and the distribution width was 3.5μ.

EXAMPLE 6

Fifteen (15) parts of a partial sodium salt of an acrylic acid/itaconic acid copolymer was dissolved in 135 parts of deionized water to obtain a 10-% aqueous solution. Thirty (30) parts of this 10-% aqueous solution containing the acrylic acid/itaconic acid copolymer was mixed with 60 parts of the 10-% aqueous solution of the sulfonic acid-modified polyvinyl alcohol used in Example 2, and then the mixture was adjusted to a pH of 4.8 by addition of a 20-% aqueous caustic soda. This mixture was further mixed with 180 parts of the oil included dyes used in Example 1 to form a uniform emulsion having an average particle size of 4.3μ. Separately, a melamine/formaldehyde precondensate was prepared by mixing 10 parts of melamine with 20 parts of 37-% formalin and adjusting the product to a pH of 8.5 by addition of caustic soda.

The above-produced emulsion was mixed with the melamine/formaldehyde precondensate and 100 g of deionized water. The mixture was heated with stirring to 65° C., then kept at this temperature for 1 hour and cooled by standing at room temperature to obtain a capsule slurry. The slurry had a viscosity of 700 cps and sufficient utility though the film compactness was somewhat poor as compared with that in Example 1.

Table 3 tabulates the evaluation of the slurries obtained in Examples 4, 5 and 6.

TABLE 3

|  | Example 4 | Example 5 | Example 6 |
|---|---|---|---|
| Slurry Viscosity (cps) | 940 | 270 | 700 |
| Emulsifying Power (μ) | 4.0 | 4.4 | 4.3 |
| Stability for Emulsion (μ) | | | |
| Change in Average Size | 0.2 | 0.1 | 0.1 |
| Distribution Width | 2.8 | 3.5 | 3.0 |
| Wall Film Compactness | good | good | good |
| Agglomerate | null | null | null |

We claim:

1. Process for producing microcapsules containing hydrophobic core material for carbonless duplicating sheets which comprises forming capsule walls by forming and accumulating aminoaldehyde polycondensate around a hydrophobic material in hydrophilic medium, wherein said hydrophilic medium comprises a combination of anion-modified water-soluble polymer containing carboxyl group including, as a component, at least one member selected from the group consisting of acrylic acid, methacrylic acid, crotonic acid, itaconic acid, and anhydrides or partial light metal salts thereof and an anion-modified polyvinyl alcohol derivative containing sulfo group and/or sulfonyldioxy group in the range of a mixing ratio by weight of 10:90 to 90:10, the saponification degree of said anion-modified polyvinyl alcohol derivative ranging from 93 to 99 percent, and sulfo group or sulfonyldioxy group content of said anion-modified polyvinyl alcohol derivative ranging from 0.5 to 20 mol percents.

2. Process according to claim 1, wherein said anionic water-soluble polymer has a carboxyl content of 10 to 100 mol %.

3. Process according to claim 1, wherein said aminoaldehyde resin is obtained by polycondensing at least one member selected from the group consisting of urea, methylolurea, alkylurea, thiourea, melamine alkylmethylolmelamine and guanidin with an aldehyde.

4. Process according to claim 1, wherein the mixing ratio of anion-modified polyvinyl alcohol derivative containing sulfo group or sulfonyldioxy group to said anion-modified water-soluble polymer containing carboxyl group ranges from 70:30 to 30:70.

* * * * *